United States Patent [19]  
Ito

[11] Patent Number: 4,839,561  
[45] Date of Patent: Jun. 13, 1989

[54] GYROTRON DEVICE

[75] Inventor: Yasuyuki Ito, Yokohama, Japan

[73] Assignee: Kabushiki Kaisha Toshiba, Kawasaki, Japan

[21] Appl. No.: 807,969

[22] Filed: Dec. 12, 1985

[30] Foreign Application Priority Data

Dec. 26, 1984 [DE] Fed. Rep. of Germany .... 59-281106

[51] Int. Cl.$^4$ ............................................. H01J 25/00
[52] U.S. Cl. ............................................. 315/4; 315/5; 315/3; 315/5.41; 315/5.44
[58] Field of Search ................ 376/123, 124, 131, 132; 372/2, 94, 92; 315/3, 5.41, 5.44, 4, 5, 5.18, 5.24

[56] References Cited

U.S. PATENT DOCUMENTS

| | | | |
|---|---|---|---|
| 4,356,430 | 10/1982 | Stone et al. | 315/5 |
| 4,398,121 | 8/1983 | Chodorow et al. | 315/5 |
| 4,531,103 | 7/1985 | Evans et al. | 315/5 |
| 4,554,484 | 11/1985 | Read et al. | 315/5 |
| 4,559,475 | 12/1985 | Manheimer et al. | 315/5.24 |
| 4,562,380 | 12/1985 | Dionne | 315/4 |
| 4,570,103 | 2/1986 | Schoen | 372/2 |
| 4,620,170 | 10/1986 | Lavering | 315/4 |
| 4,636,688 | 1/1987 | Ito | 315/4 |

FOREIGN PATENT DOCUMENTS

| | | | |
|---|---|---|---|
| 136702 | 3/1950 | Australia | 315/5 |
| 0119902 | 9/1984 | European Pat. Off. | 315/5 |

OTHER PUBLICATIONS

Beyer et al., The Beam Waveguide Launcher for High Power ECRH Heating in Large Tandem Mirror Machines, (855–857), 1981.
Porkolab, Nuclear Fusion, vol. 21, No. 12, (1981), Electron Cyclotron Resonance Heating of Plasmas in Tandem Mirrors.
V. A. Flyagin et al., IEEE Transaction on Microwave Techniques, vol. Mtt-25(6), 514, (1977), "The Gyrotron".
P. Sprangle et al., Phys Rev. A, 26(6), 3127, (1981), "Theory of the Quasioptical Electron Cyclotron Maser".
K. Ikuta et al., "Helical Magnetic Configurations Produced with the Help of Ferromagnetic Materials ... ", Nuclear Fusion, 20(1)3J, 1980.

Primary Examiner—David K. Moore  
Assistant Examiner—Michael Razavi  
Attorney, Agent, or Firm—Oblon, Fisher, Spivak, McClelland & Maier

[57] ABSTRACT

A gyrotron device including an electron gun for emitting a hollow electron beam, solenoid coils for generating magnetic fields so as to produce a cyclotron movement to the electron beam emitted from the electron gun, a plurality of ring mirrors arranged in the direction of the beam axis of the electron beam, and an optical resonator for resonating the electromagnetic waves produced when the electron beam is injected along the magnetic field lines. The optical resonator includes a slotted reflecting mirror so that a portion of the electromagnetic waves propagating within the resonator is reflected upstream to intersect and interact with the electron beam plural times. In order to maximize energy absorption by the electromagnetic waves, the solenoid coils are separately excited so as to shift the radius of the electron beam $\lambda/4$ within the resonator, $\lambda$ being the wavelength of electromagnetic waves. Inserted within at least one of the solenoid coils is a magnetic material having helically symmetrical grooves formed in the inner wall thereof in order to produce magnetic lines of force formed in a helix.

13 Claims, 4 Drawing Sheets

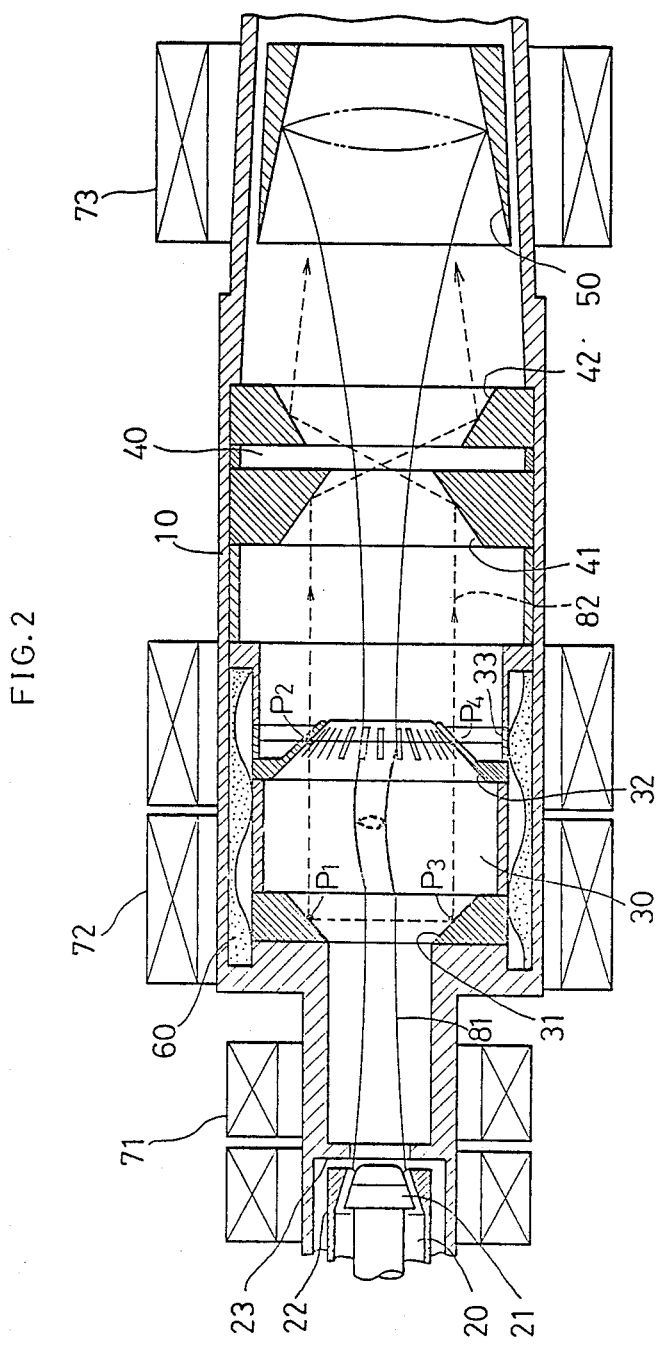

GYROTRON DEVICE

BACKGROUND OF THE INVENTION

1. Field of the Invention

This invention relates to gyrotron devices for generating electromagnetic waves, and more particularly, to gyrotron devices applied to electron cyclotron resonance heating, i.e., for heating plasma in nuclear fusion reactors with the electromagnetic waves.

2. Discussion of Background

FIG. 1 shows a gyrotron device of the above-noted type, whose construction includes an electron gun 1 for emitting an electron beam in the direction of arrow Z, a magnetic coil 2 for giving a cyclotron movement to electrons in the electron beam emitted from the electron gun 1, a cavity resonator 3 for resonating the electromagnetic wave generated from the electron beam, and an output section 5 for transmitting the electromagnetic wave through an output window 4. The inner diameter of the cavity resonator 3, generally, becomes small in proportion to the wavelength of the electromagnetic wave.

When an electromagnetic wave with a frequency higher than 100 GHz and a power level of megawatts is generated by using the gyrotron device with the above-mentioned cavity resonator 3, the resonating frequency of the electromagnetic wave in the cavity resonator 3 is so high that the resonator 3 cannot have an inner diameter large enough to reduce Joule heat to a tolerable level. As a result, the ohmically heated inner wall of the cavity resonator 3 inevitably receives extremely high heat ($>1$ KW/cm$^2$). This gyrotron device, therefore, cannot practically supply high power continuous or long pulse electromagnetic waves having a frequency higher than 100 GHz. A complex system having plural gyrotron devices must then be constructed to achieve the electron cyclotron resonance heating of fusion plasma.

In the above-mentioned gyrotron device, the electromagnetic wave is transmitted through the output window 4 in an optional direction. This requires the use of a waveguide for transmitting the wave to the desired place. When the electromagnetic wave is transmitted in this manner through the waveguide, its energy is gradually decreased due to ohmic losses, i.e., the transmission efficiency of the electromagnetic wave is reduced. In addition, if the electromagnetic wave is transmitted through the waveguide, it is difficult to focus the wave power onto a desired object. This is another reason why the above-mentioned gyrotron device is unfavorable for heating plasma in a nuclear fusion reactor.

Another type of gyrotron device is known which uses a Fabry-Perot resonator. This device is called a "quasi-optical gyrotron". The axis of its resonator is perpendicular to that of magnet coils which generate a magnetic field to guide an electron beam emitted by an electron gun. The device is thus non-axisymmetric, which requires complicated positional adjustments of mirrors, the electron gun, magnet coils, and the like, which inevitably raises the cost of manufacturing the quasi-optical gyrotron.

SUMMARY OF THE INVENTION

Accordingly, the objects of this invention are to provide a novel gyrotron device which is relatively small, which has an axially symmetrical configuration which can efficiently generate an intense beam of electromagnetic wave, and which can efficiently transmit and easily focus the beam.

These and other objects are achieved according to the present invention by providing a novel gyrotron in which electromagnetic waves are resonated by means of an optical resonator and in which the electromagnetic waves intersect and interact with, i.e., exchange energy with, an electron beam plural times within the resonator.

Namely, the gyrotron device according to the present invention includes an electron gun for emitting a hollow electron beam, magnetic field generating means for generating magnetic fields so as to produce a cyclotron movement in the electron beam emitted from the electron gun, a plurality of annular mirrors arranged in the direction of the beam axis of the electron beam, and an optical resonator for resonating the electromagnetic waves produced when the electron beam is injected along the magnetic field lines, the optical resonator being so arranged that the electromagnetic waves propagating within the resonator intersect and interact with the electron beam plural times.

According to the present invention, since the electromagnetic waves thus produced are quasi-optically resonated by use of the optical resonator, the Joule heat deposited on the mirrors of the resonator can be strikingly reduced. Further, since the electromagnetic waves intersect the electron beam plural times within the resonator, the electromagnetic waves can be generated with a high efficiency.

Furthermore, the electromagnetic waves thus produced can easily be transmitted by an axially symmetrical and quasi-optical transmission channel with the energy loss in the transmission process being minimized.

Moreover, transmitting the electromagnetic waves through quasi-optical transmitting means enables the electromagnetic waves to be easily focused on the object to be radiated.

BRIEF DESCRIPTION OF THE DRAWINGS

A more complete appreciation of the invention and a number of the attendant advantages thereof will be readily obtained as the same becomes better understood by reference to the following detailed description when considered in connection with the accompanying drawings, wherein:

FIG. 2 is a cross-sectional view of a first example of the gyrotron device according to the present invention;

DESCRIPTION OF THE PREFERRED EMBODIMENTS

Figure 1:
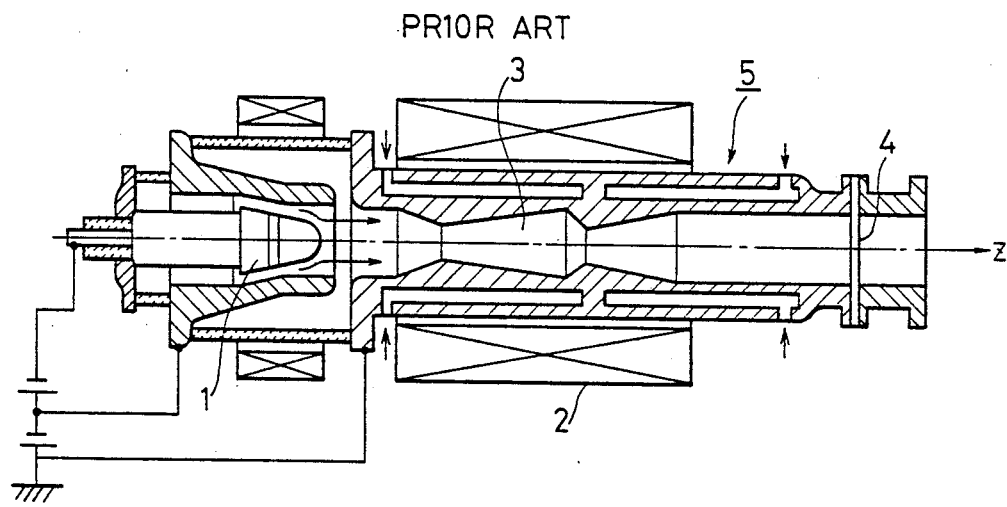
FIG. 1 is a cross-sectional view of a conventional gyrotron device.

Referring now to the drawings, wherein like reference numerals designate identical or corresponding parts throughout the several views, and more particularly to FIG. 2 thereof, the gyrotron device according to one embodiment of the present invention includes a cylindrical body 10 within which there is provided, from left to right, and electron gun 20, ring-shaped curved resonator mirrors 31, 32 constructing an optical resonator 30, a second ring-shaped curved surface mirrors 41, 42 constructing and electromagnetic wave transmission channel 40 which transmits the electromagnetic waves, and an electron beam collector 50. Around the optical resonator 30, there is provided a hollow space in which there is disposed a magnetic material 60, while surrounding the outer periphery of the ring-shaped curved resonator mirror 32 of the resonator 30, there is provided a ring mirror 33. Moreover, exterior to the cylindrical body 10, there are provided, from left to right, magnetic coils 71, 72, 73.

The electron gun is of the magnetron type including a cathode 21 for emitting a hollow electron beam, a control electrode 22 and an anode 23. The electron beam 81 emitted from the electron gun 20 is injected into the optical resonator 30. In the optical resonator 30, electromagnetic waves 82 are excited by the gyrating electron beam 81 passing the lines of force of the magnetic fields produced by the magnetic coils 71, 72. The electron beam 81 passing through the resonator 30 is collected by an electron beam collector being located within the electromagnetic wave transmission channel 40.

Figure 3:
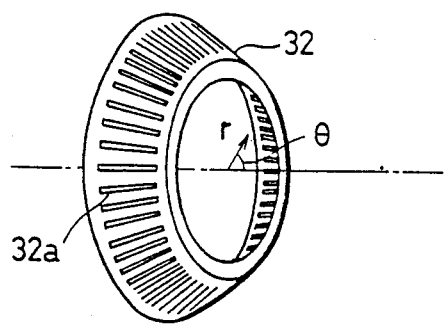
FIG. 3 is a perspective view of a construction of a ring-shaped curved surface mirror used for the gyrotron device shown in FIG. 2.

The resonator 30 includes a first ring-shaped curved resonator mirror 31 and a second ring-shaped curved resonator mirror 32 which reflect both the electromagnetic waves propagating in the radial direction and the electromagnetic waves propagating in the axial direction. The second ring-shaped curved resonator mirror 32 has a plurality of slots 32a extended radially and axially as shown in FIG. 3. The electromagnetic waves which resonate within the resonator 30 propagate along the following path:

P1 → P2 → P4 → P3 → P1 and the reverse path thereof, so as to form standing waves. The electromagnetic waves propagating along each of the paths

P1 → P3 → ( P3 → P1 )

and

P2 → P4 → ( P4 → P2 )

intersect or encounter the electron beam and interact with, i.e., absorb energy form, the electron beam. The electromagnetic waves produced from the resonator 30 propagate both in the axial and radial directions through the slots 32a of the ring-shaped curved resonator mirror 32. The electromagnetic waves propagating in the radial direction, are reflected by the resonator mirror 33 which surrounds the ring-shaped curved resonator mirror 32 and then are reflected by the outer surface of the mirror 32 to be overlapped with the electromagnetic waves 82 propagating in the axial direction. The electromagnetic waves 82 which pass through the slots 32a are reflected by the ring-shaped curved mirrors 41 and 42 constituting the electromagnetic wave transmission channel 40 and are outputted in the right direction, i.e., downstream, so that they may be transmitted to a target placed on the axis thereof.

The magnetic material 60 surrounding the resonator 30 has helically symmetrical grooves in the inner wall surface thereof. The lines of force of the magnetic field within the optical resonator 30 are helically shaped by this magnetic material 60.

With this construction, the electromagnetic waves propagating in the resonator 30 intersect and interact with the electron beam passing through the resonator 30 plural times (i.e., twice). Namely, the waves encounter the electron beam 81 when they propagate along the paths P1→ P3 and P2 → P4. As a result, the high power electromagnetic waves can be produced at high efficiencies.

In the embodiment according to the present invention, further improvement in the efficiency for producing the electromagnetic waves can be achieved by the combination of the ring-shaped curved resonator mirrors 31,32 and the hollow magnetic material 60, for the following reasons:

The electric field of electromagnetic waves oscillated in the resonator 30 are proportional to $\cos(m\theta)$, ($m=0, 1, 2 \ldots$), where m is the azimuthal mode number of the electromagnetic waves of $\theta$ is the angle defined in FIG. 3. When the electromagnetic waves are oscillated with modes of $m>0$ located at the angle $$\theta \approx (2n+1)\pi/2m \text{ (n: integer)},$$

does not efficiently impart energy to the electromagnetic waves because of weak electric fields. If the magnetic material 60 with helically symmetrical inner wall is inserted into the magnetic coil 72, the magnetic lines of force are also arranged helically. Let the radius of the hollow electron beach be $r_B$. When the magnetic material 60 having the helically symmetrical inner wall rotates the magnetic lines of force at the radius $r_B$ with the angle of $\pi/2m$ in the region from the ring-shaped curved mirror 31 to the mirror 32, the electron beam passing through the weak electric field region in the mirror 31, that is, $$\theta \approx (2n+1)\pi/2m$$

now advances to the strong electric field region of $$\theta \approx (n+1)\pi/m$$

in the mirror 32 so that the energy of the electron beam can be efficiently transferred to the electromagnetic field.

In this manner as described above, even when the electromagnetic waves of $m \neq 0$ are oscillated, the electromagnetic waves of mode m, which satisfy that condition of $\pi/2m$ being equal to the angle of rotation of the helical magnetic field, can selectively be amplified with a high efficiency.

On the other hand, the electric field of electromagnetic waves within the mirrors 31 and 32 is generally proportional to $$\sin (2\pi r/\lambda)$$

in the radial direction, where $\lambda$ indicates the wavelength of the electromagnetic waves and r the radius of position. When the thickness of the hollow electron beam becomes larger than $\lambda/4$, the electron beam will pass through the region with the radius $$r = n\lambda/(2\pi) \text{ (n integer)}$$

in the ring-shaped curved mirror 31, i.e., the weak electric field region, and the energy of the electron beam cannot efficiently be given to the electromagnetic waves.

When the magnetic fields are graded by adjustment of the current flowing through the plurality of the magnetic coils 72 for applying the magnetic fields to the resonator, a similar result as described in the foregoing can be obtained by shifting the radius of the electron beam $\lambda/4$ during the travel of the electron beam from the mirror 31 to the mirror 32.

In the device according to the present invention, since the electromagnetic waves are quasi-optically reflected to resonate by use of the optical resonator 30, the heat load affecting the resonator 30 can strikingly be reduced, as compared with the case when a cavity resonator is used. Also, since the electromagnetic waves intersect or encounter the electron beam twice within the resonator 30 in the device according to the present invention, the efficiency for generating the electromagnetic waves can be improved.

Furthermore, in the device according to the present invention, further improvement in the efficiency for generating the electromagnetic waves can be achieved by making the lines of force of the magnetic fields be helical within the resonator 30 by means of the hollow magnetic material 60, and also by shifting the radius of the hollow electron beam between the ring-shaped curved resonator mirrors 21 and 32 about $\lambda/4$ in the axial direction as well, for the reasons described in the foregoing.

According to the present invention, since the axially symmetric optical resonator 30 is used, the electromagnetic waves produced can easily be transmitted to an electromagnetic wave transmission channel with the energy loss in the process of transmitting the electromagnetic waves being minimized. In addition, transmission of the electromagnetic waves by optical transmission means enables the electromagnetic waves to be easily focussed to an object to be radiated. Accordingly, the gyrotron device according to the present invention can be extremely effective for in plasma heating in nuclear fusion reactors.

Figure 4:
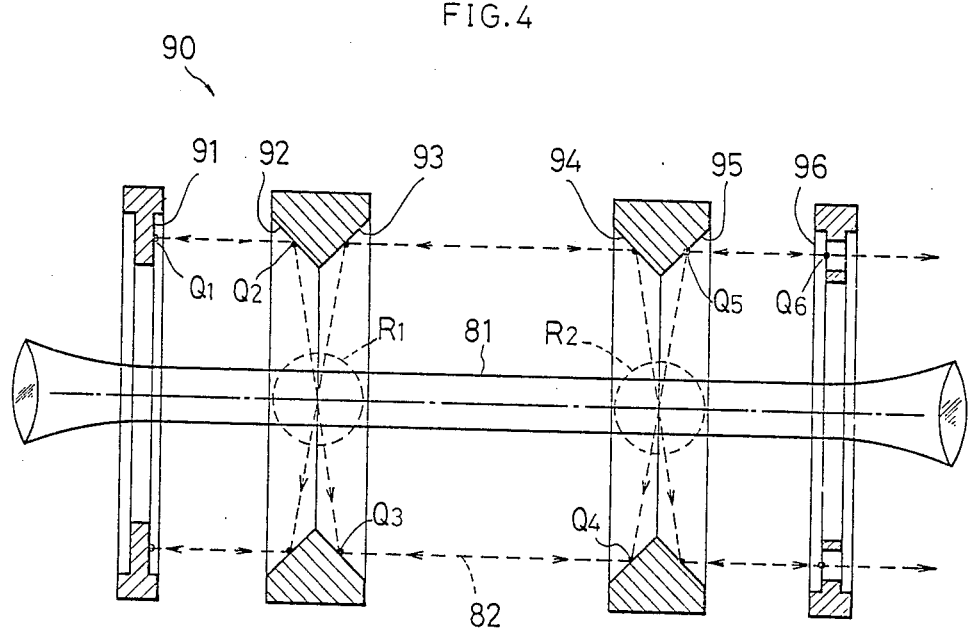
FIG. 4 is a cross-sectional view of a general construction of the gyrotron device according to a second embodiment of the present invention.

FIG. 4 shows an extension of the principal construction of the embodiment shown in FIG. 2. The construction of the embodiment shown in FIG. 4 is the same as that of FIG. 2, except for the structure of the resonator. Namely, in this embodiment, the construction of the optical resonator is designed to have the electromagnetic waves intersect the electron beam several times. Accordingly, in this embodiment, the resonator 90 includes six ring-shaped mirrors 91 through 96. In this case, the electromagnetic waves oscillated within the resonator 90 propagate along the following paths, $$Q_1 \rightarrow Q_2 \rightarrow Q_3 \rightarrow Q_5 \rightarrow Q_6$$

and its reverse paths, thus forming the standing waves thereof. As a result, the hollow electron beam encounters the electromagnetic waves in the two regions of R1 and R2. Here, the provision at the ring mirror 96 of a plurality of slots 96a similar to the slots 32a shown in FIG. 3 enables the electromagnetic waves to be transmitted outside of the resonator 90.

With this arrangement, it is apparent that similar effects to those described in the foregoing embodiments can be obtained.

It is also apparent that the present invention is not limited to the embodiments described in the foregoing. For instance, the number of the mirrors constituting the optical resonator and its arrangement as well are not limited to those shown in FIGS. 2 and 4, but various modifications may be conveniently made in accordance with the invention. In short, any similar construction can be employed in order that the electromagnetic waves intersect or encounter the electron beam plural times.

Figure 5A:
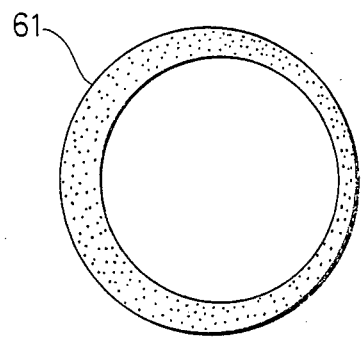
FIGS. 5a and 5b are cross-sectional views of respective embodiments of the magnetic material used for the gyrotron device shown in FIGS. 2 and 4.
Figure 5B:
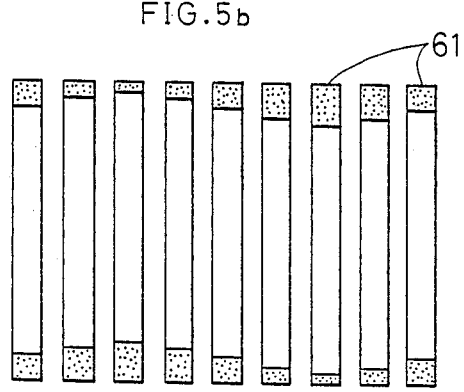

Moreover, the magnetic material 60 need not necessarily be integrally formed, but is may also be segmented, i.e., divided in the axial direction as shown in FIGS. 5a and 5b. In addition, the output efficiency of the electromagnetic waves can also be increased by mounting an electromagnetic horn in the slots of the second ring-shaped curved surface mirror.

Finally, one may dispense with the magnetic material 60 when sufficient power output of the electromagnetic waves is obtainable by a mere intersection of the electromagnetic waves with the electron beam plural times.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A gyrotron device comprising:
   an electron gun for emitting a hollow electron beam defining a beam axis;
   magnetic field generating means for generating a magnetic field to produce a cyclotron movement in the electron beam emitted from said electron gun;
   an optical resonator for resonating electromagnetic waves generated as the electron beam is injected along the magnetic field lines, said optical resonator comprising means for reflecting the electromagnetic waves propagating within said resonator such that said electromagnetic waves intersect and interact with the electron beam plural times; and
   a plurality of ring mirrors arranged downstream of the resonator in the direction of the beam axis of said electron beam for transmitting electromagnetic waves resonated by said resonator;
   wherein said reflecting means comprises,
   a slotted reflecting mirror for reflecting a portion of said electromagnetic waves in a direction substantially transverse to said electron beam and then upstream in the direction of the beam axis and for transmitting remaining portions of said electromagnetic waves downstream toward said plurality of ring mirrors through slots formed in said slotted reflecting mirror, and
   at least one reflecting ring for reflecting electromagnetic waves reflected upstream by said slotted reflecting mirror in a direction substantially transverse to said electron beam and then downstream back towards said slotted reflecting mirror.

2. A gyrotron device as claimed in claim 1 wherein said magnetic field generating means comprises:
   means for producing a magnetic field having magnetic lines of force formed in a helix along the beam axis of the electron beam.

3. A gyrotron device as claimed in claim 2, wherein said means for producing a magnetic field having magnetic lines of force formed in a helix comprises:

a magnetic material having helically symmetrical grooves in an inner wall surface of said magnetic material, said magnetic material surrounding at least a portion of said optical resonator.

4. A gyrotron device as claimed in claim 1, wherein said magnetic field generating means comprises:
   plural solenoid coils surrounding said optical resonator and arranged coaxially with the beam axis of the electron beam; and
   means for separately exciting said plural solenoid coils such that the radius of the electron beam is shifted $\lambda/4$ within the optical resonator, where $\lambda$ equals the wavelength of the electromagnetic waves.

5. A gyrotron device as claimed in claim 2, wherein said magnetic field generating means comprises:
   plural solenoid coils surrounding said optical resonator and arranged coaxially with the beam axis of the electron beam; and
   means for separately exciting said plural solenoid coils such that the radius of the electron beam is shifted $\lambda/4$ within the optical resonator, where $\lambda$ equals the wavelength of the electromagnetic waves.

6. A gyrotron devices as claimed in claim 4, wherein said magnetic field generating means further comprises:
   means for producing a magnetic field having magnetic lines of force formed in a helix along the beam axis of the electron beam.

7. A gyrotron device in claim 6, wherein said means for producing a magnetic field having magnetic lines of force formed in a helix comprises:
   a magnetic material having inner walls in which are formed helically symmetrical grooves, said magnetic material inserted within at least one of said solenoid coils.

8. A gyrotron device as claimed in claim 3, wherein said magnetic material comprises plural divided segments extending in the direction of the beam axis.

9. A gyrotron device as claimed in claim 7, wherein said magnetic material comprise plural divided segments extending in the direction of the beam axis.

10. A gyrotron device comprising:
    an electron gun for emitting a hollow electron beam defining a beam axis;
    magnetic field generating means for generating a magnetic field to produce a cyclotron movement in the elelctron beam emitted from said electron gun;
    an optical resonator for resonating electromagnetic waves generated as the electron beam is injected along the magnetic field lines; and
    a plurality of ring mirrors arranged downstream of the resonator in the direction of the beam axis for transmitting electromagnetic waves emitted from said resonator;
    said optical resonator comprising means for reflecting the electromagnetic waves propagating within said resonator, including a slotted reflecting mirror for reflecting a portion of said electromagnetic waves in a direction substantially transverse to said electron beam and then upstream in the direction of the beam axis and for transmitting remaining portions of said electromagnetic waves downstream toward said plurality of ring mirrors through slots formed in said slotted reflecting mirror; and
    said magnetic field generating means comprising means for producing a magnetic field having magnetic lines of force formed in a helix along the beam axis of the electron beam;
    wherein said magnetic field generating means comprises:
    plural solenoid coils surrounding said optical resonator and arranged coaxially with the beam axis of the electron beam; and
    means for separately exciting said plural solenoid coils such that the radius of the electron beam is shifted $\lambda/4$ within the optical resonator, where $\lambda$ equals the wavelength of the electromagnetic waves.

11. A gyrotron device as claimed in claim 10, wherein said means for producing a magnetic field having magnetic lines of force formed in a helix comprises:
    a magnetic material having helically symmetrical grooves in an inner wall surface of said magnetic material, said magnetic material surrounding at least a portion of said optical resonator.

12. A gyrotron device as claimed in claim 11, wherein said magnetic material comprise plural divided segments extending in the direction of the beam axis.

13. A gyrotron device comprising:
    an electron gun for emitting a hollow electron beam defining a beam axis;
    magnetic field generating means for generating a magnetic field to produce a cyclotron movement in the electron beam emitted from said electron gun;
    an optical resonator for resonating electromagnetic waves generated as the electron beam is injected along the magnetic field lines; and
    a plurality of ring mirrors arranged downstream of the resonator in the direction of the beam axis for transmitting electromagnetic waves emitted from said resonator; and
    said magnetic field generating means comprising:
    plural solenoid coils surrounding said optical resonator and arranged coaxially with the beam axis of the electron beam,
    said optical resonator comprising means for reflecting the electromagnetic waves propagating within said resonator, including a slotted reflecting mirror for reflecting a portion of said electromagnetic waves in a direction substantially transverse to said electron beam and then upstream in the direction of the beam axis and for transmitting remaining portions of said electromagnetic waves downstream toward said plurality of ring mirrors through slots formed in said slotted reflecting mirror; and
    means for separately exciting said plural solenoid coils such that the radius of the electron beam is shifted $\lambda/4$ within the optical resonator, where $\lambda$ equals the wavelength of the electromagnetic waves.

* * * * *